United States Patent
Sivakumar et al.

(10) Patent No.: US 11,619,853 B2
(45) Date of Patent: Apr. 4, 2023

(54) METHOD FOR AGE PORTRAYING AND PAINTING IN ELECTROCHROMIC AUTOMOBILE SHEET

(71) Applicant: International Business Machines Corporation, Armonk, NY (US)

(72) Inventors: Gandhi Sivakumar, Bentleigh (AU); Anil Manohar Omanwar, Vikasnagar (IN); Kushal S. Patel, Pune (IN); Sarvesh S. Patel, Pune (IN)

(73) Assignee: International Business Machines Corporation, Armonk, NY (US)

( * ) Notice: Subject to any disclaimer, the term of this patent is extended or adjusted under 35 U.S.C. 154(b) by 214 days.

(21) Appl. No.: 17/030,721

(22) Filed: Sep. 24, 2020

(65) Prior Publication Data
US 2022/0091468 A1    Mar. 24, 2022

(51) Int. Cl.
*G02F 1/163*    (2006.01)
*B60S 5/00*    (2006.01)
*G02F 1/15*    (2019.01)
*G08G 1/00*    (2006.01)

(52) U.S. Cl.
CPC ............... *G02F 1/163* (2013.01); *B60S 5/00* (2013.01); *G02F 1/15* (2013.01); *G08G 1/20* (2013.01); *G08G 1/207* (2013.01)

(58) Field of Classification Search
CPC ... B60S 5/00; G02F 1/163; G02F 1/15; G08G 1/20; G08G 1/207
See application file for complete search history.

(56) References Cited

U.S. PATENT DOCUMENTS

| | | |
|---|---|---|
| 8,731,977 B1 | 5/2014 | Hardin et al. |
| 10,410,182 B1 | 9/2019 | Tang et al. |
| 10,417,307 B1 | 9/2019 | Abrahams et al. |
| 2007/0190368 A1* | 8/2007 | Jung ................. F41H 3/00 709/224 |
| 2012/0230548 A1 | 9/2012 | Calman et al. |
| 2016/0132705 A1 | 5/2016 | Kovarik et al. |
| 2019/0322129 A1 | 10/2019 | Lee |
| 2020/0050856 A1 | 2/2020 | Chikkaveerappa et al. |

(Continued)

OTHER PUBLICATIONS

Mortimer, "Switching Colors with Electricity", American Scientist, A Publication of SIGMA XI, printed Jul. 22, 2020, 37 pages. https://www.americanscientist.org/article/switching-colors-with-electricity.

(Continued)

*Primary Examiner* — Tyler J Lee
*Assistant Examiner* — Yufeng Zhang
(74) *Attorney, Agent, or Firm* — Jeffrey M. Ingalls

(57) ABSTRACT

A computer-implemented method for altering an appearance of an electrochromic coating of a vehicle is provided. The method includes obtaining vehicle information related to at least one vehicle attribute. The method also includes applying weightage factors to the at least one vehicle attribute. The method also includes determining that a vehicle is a boundary area of a testing zone based on a determined location of the vehicle. The method also includes changing a base appearance of the electrochromic coating of the vehicle to an altered appearance based on the determination that the vehicle is in the boundary area and based on the weightage factors of the vehicle components.

20 Claims, 8 Drawing Sheets

(56) References Cited

U.S. PATENT DOCUMENTS

2020/0114815 A1* 4/2020 Massengill ............ B60Q 1/535
2020/0246812 A1* 8/2020 Schmalenberg .......... F41H 9/06

OTHER PUBLICATIONS

Haring et al., "A Cognitive Model of Drivers Attention", Research Center for Advanced Science and Technology, The University of Tokyo, printed Jul. 22, 2020, 6 pages. https://iccm-conference.neocities.org/2012/proceedings/papers/0067/paper0067.pdf.
"Electrochromic polymers create coatings that change colour", European Coatings, Feb. 11, 2015, 2 pages. https://www.european-coatings.com/Raw-materials-technologies/Technologies/Electrochromic-polymers-create-coatings-that-change-colour.
"Colour Changing Paint" Article, printed Jul. 22, 2020, 1 page.
Kienzle et al., "How 5G can spark an electronics revolution", IBM Institute for Business Value, printed Sep. 24, 2020, 8 pages.
Mell et al., "The NIST Definition of Cloud Computing", Recommendations of the National Institute of Standards and Technology, Special Publication 800-145, Sep. 2011, 7 pages.

* cited by examiner

METHOD FOR AGE PORTRAYING AND PAINTING IN ELECTROCHROMIC AUTOMOBILE SHEET

BACKGROUND

With the emergence of nano-technology and the progression in the material sciences, there are certain paints (or other surface coatings) that are capable of changing their color (or appearance) based on certain input. For example, electronic circuitry is attached to painted material which is used to control the color of the paint. The color of the paint may be dependent on the input current and the voltage provided by a controller. These electrochromic paints (also referring to as smart paints or electronically switchable color tuners) may be used to create partitions, or they may be used to create and display dynamic messages in the paints. In other examples, the electrochromic paints may be used to create a specific ambience, look, appearance etc. They may also be used to control the amount of heat or light that reflects from the paint based on an electronic input, giving the paints the ability to regulate temperatures or create privacy.

In general, these electrochromic materials utilize the principle of electrochromism, which allows certain materials to change color (or even opacity) when a voltage is applied. Although an amount of electricity is required for changing the appearance of the paint, no electricity is needed for maintaining a particular shade once the change has been affected. That is, electrochromic devices may switch slowly, but do not require a continuous application of an electric field to maintain an altered state. These electrochromic paints may have a variety of different applications.

Vehicle motor systems are becoming more intelligent with the integration of latest technology. The automation in self-driving vehicles is increasing and leveraging the advancements in Big Data and cloud technology for better performance. These modern automobile systems are becoming more intelligent with cognition enablement and artificial intelligence capabilities embedded therein. This may enable automatic driving vehicles where the driving decisions are made runtime by a cognitive system embedded in the vehicle. These cognition-enabled vehicles generally possess the capability to collect information from various sensors placed over the vehicle (or from various sources external to the vehicle) and process the information by applying various machine learning models on the collected information.

SUMMARY

Embodiments of the present disclosure relate to a computer-implemented method for altering an appearance of an electrochromic coating of a vehicle is provided. The method includes obtaining vehicle information related to at least one vehicle attribute. The method also includes applying weightage factors to the at least one vehicle attribute. The method also includes determining that a vehicle is a boundary area of a testing zone based on a determined location of the vehicle. The method also includes changing a base appearance of the electrochromic coating of the vehicle to an altered appearance based on the determination that the vehicle is in the boundary area and based on the weightage factors of the vehicle components.

Other embodiments relate to a computer program product utilizing the methods described above.

Other embodiments relate to a computer system utilizing the methods described above.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, explain the principles of the disclosure. The drawings are only illustrative of certain embodiments and do not limit the disclosure.

Figure 1:
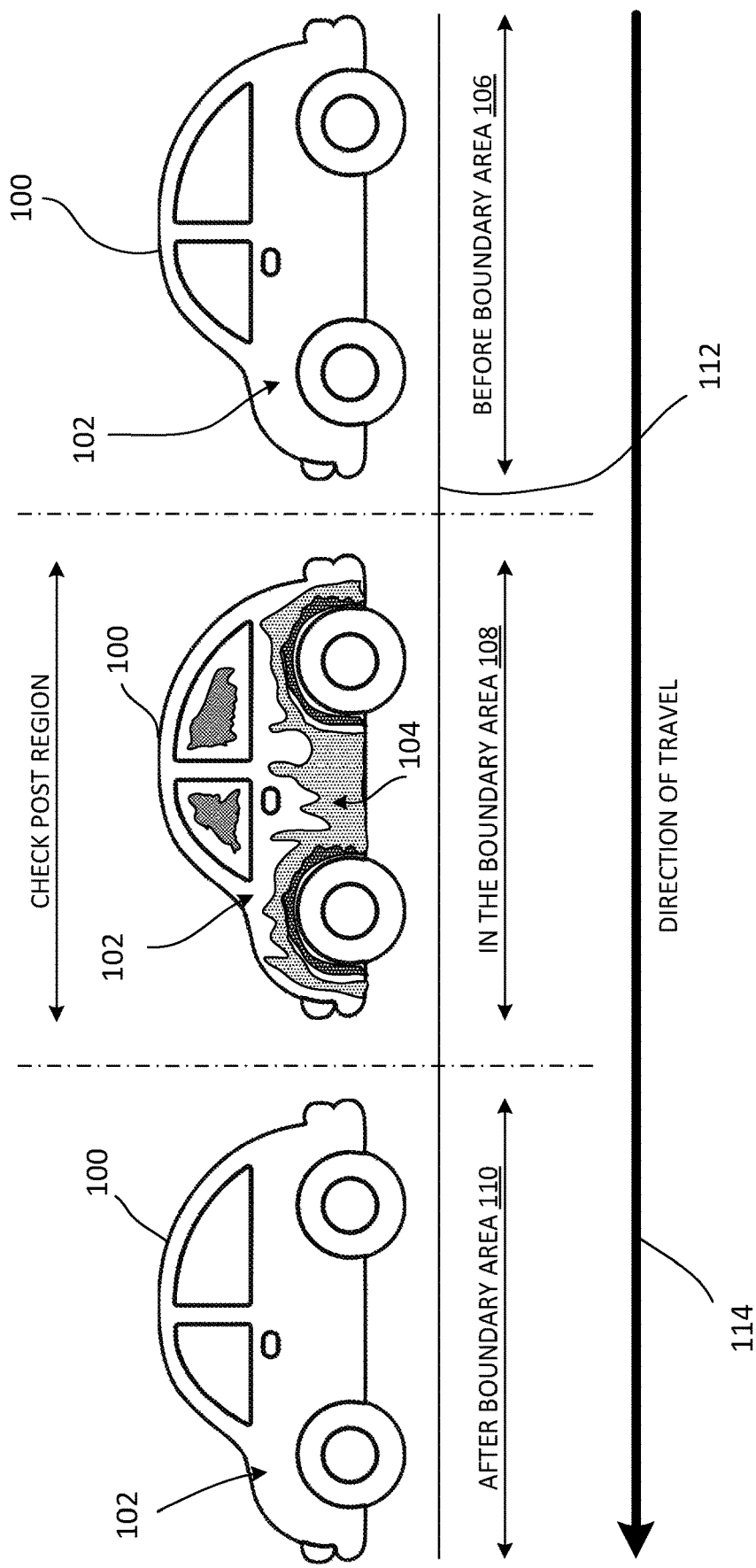
FIG. 1 is a diagram of an example of age portraying of a vehicle having an electrochromic automobile sheet when the automobile passes through a checkpoint zone, according to embodiments.

It should be appreciated that elements in the figures are illustrated for simplicity and clarity. Well-understood elements that may be useful or necessary in a commercially feasible embodiment may not be shown for the sake of simplicity and to aid in the understanding of the illustrated embodiments.

DETAILED DESCRIPTION

The present disclosure relates to methods and systems for proactive age portraying and painting in an electrochromic automobile sheet. In particular, the present disclosure relates to systems and methods for changing the appearance of an external surface of a vehicle when the vehicle approaches a suitable checkpoint area depending on a determination of certain characteristics of the vehicle.

Certain organizations may have an interest in being able to quickly estimate an age or a condition of a vehicle. Examples of such conditions may include the overall age of the car, required maintenance that must be performed with regard to certain components of the vehicle such as regular oil changes, fluid levels, the presence of a catalytic converter, an age of the engine of the car, greenhouse exhaust emission levels, etc. An example of an organization that may have an interest in determining the condition of a car may be an automobile rental company. As customers return a vehicle after the completion of a rental term, it may be desirable for the rental company to check on the condition of the vehicle. This could be for purposes of determining if any damage was done to the vehicle during the rental period, or simply to ensure that the vehicle is receiving proper maintenance, so the vehicle is running properly for the next customer. Such an organization may have a checkpoint (e.g., a rental car return station) or location for inspecting vehicles. Another example of an organization that may have an interest in inspecting a condition of a vehicle may be a regional transportation authority. That is, certain geographical regions (e.g., a state or a country) may have regulations or guidelines with regard to the maintenance of a vehicle, and certain of these guidelines may be aimed at helping to reduce vehicle emissions. Any of these above described organizations (or any other suitable organization) may have checkpoints at particular locations where vehicles may undergo an inspection. However, manually checking paper records of a vehicle (i.e., by an inspector) may be very time consuming and costly in terms of the checkpoints themselves as well as the checkpoint employee salaries. Moreover, checkpoint inspections may be inaccurate, and they may involve lengthy delays for the driver of the vehicle.

In certain embodiments, a system may include electrochromic paints that are used in conjunction with a smart automobile system to alter the texture or color of the vehicle based on articulated insights regarding the age and nature of the vehicle and based on positional information of the vehicle. The physical appearance of the vehicle may be observed by people outside the vehicle to provide better visual communications at desired locations, thus enabling certain advancements in automobile systems. In certain embodiments, changes to the physical appearance of the vehicle may include indications of the age or condition of the vehicle, and these include at least one of rust, dirt and dents, paint fading and paint chipping, and any other suitable visual indication of wear and tear of the vehicle. In other embodiments, the changes to the physical appearance of the vehicle may not be related to wear and tear, but may be sufficient to alert testing center personnel to the extent or degree to which the vehicle may have issues that warrant stopping the vehicle for additional inspections.

In the present embodiments, neural networks and other deep learning systems may be utilized to aid in automated determination of an age (or condition) of a vehicle. An Artificial Neural Network (ANN) (also referred to more generally as a neural network) is a computing system made up of a number of simple, highly interconnected processing elements (nodes), which process information by their dynamic state response to external inputs. ANNs are processing devices (algorithms and/or hardware) that are loosely modeled after the neuronal structure of the mammalian cerebral cortex, but on much smaller scales. Such systems progressively and autonomously learn tasks by means of examples, and they have successfully been applied to, for example, speech recognition, text processing and computer vision. A large ANN might have hundreds or thousands of processor units, whereas a mammalian brain has billions of neurons with a corresponding increase in magnitude of their overall interaction and emergent behavior.

Many types of neural networks are known, starting with feedforward neural networks, such as multilayer perceptrons, deep learning neural networks (DNNs) and convolutional neural networks. A feedforward neural network is an artificial neural network (ANN) where connections between the units do not form a cycle. A deep learning neural network is an artificial neural network with multiple hidden layers of units between the input and output layers. Similar to shallow ANNs, DNNs can model complex non-linear relationships. DNN architectures, e.g., for object detection and parsing, generate compositional models where the object is expressed as a layered composition of image primitives. The extra layers enable composition of features from lower layers, giving the potential of modeling complex data with fewer units than a similarly performing shallow network. DNNs are typically designed as feedforward networks.

In certain embodiments described herein, systems, methods and computer program products are provided that use Big Data and Artificial Intelligence (AI) to facilitate anomaly detection with regard to different real-time sources of Big Data (e.g., parking lot occupancy data gathered over time via a plurality of sensors). Machine learning, which is a subset of AI, utilizes algorithms to learn from data (e.g., Big Data) and create foresights based on this data. AI refers to the intelligence when machines, based on information, are able to make decisions, which maximize the chance of success in a given topic. More specifically, AI is able to learn from a data set to solve problems and provide relevant recommendations. AI is a subset of cognitive computing, which refers to systems that learn at scale, reason with purpose, and naturally interact with humans. Cognitive computing is a mixture of computer science and cognitive science. Cognitive computing utilizes self-teaching algorithms that use data, visual recognition, and natural language processing to solve problems and optimize processes.

As used herein, "Big Data" refers to data that is characterized, in part, by large volumes of data (e.g., terabytes, petabytes, etc. in size), a large variety of data (e.g., including structured data, unstructured data, etc.), and different sources of data, etc. An example of structured data is transactional data in a relational database. Examples of unstructured data include images, email data, sensor data, resource monitoring data, etc. Some examples for sources of Big Data include banking information, travel information, medical records, geographical information, transportation system data, passenger data, parking lot occupancy data, resource monitoring data from various layers of a cloud deployment, etc.

As used herein, a "Smart City" generally refers to a metropolitan area that utilizes different types of Big Data, and is collected from a variety of citizens, electronic Internet of Things (IoT) sensors, and other devices. The information is processed and analyzed to monitor and manage different aspects of metropolitan infrastructure such as traffic and transportation systems, power plants, water supply networks, waste management, police and fire departments, information systems, schools, libraries, hospitals, community services, etc. The data may be used to optimize the efficiency of city operations and services, such as efficiently utilizing parking facilities, as discussed herein.

Referring now to the figures and initially to FIG. 1, a diagram is shown of an example of the age portraying of a vehicle including an electrochromic automobile sheet when the automobile passes through a checkpoint zone, according to embodiments. As shown in FIG. 1, the vehicle 100 includes an electrochromic sheet 102. As the vehicle 100 moves in a direction of travel 114, the vehicle 100 begins in a zone before the boundary area 106, then passes through a boundary area 108 (that may be consistent with, for example, a rental car return zone or transportation authority checkpoint region, etc.), and then after passing through the boundary area 108 the vehicle continues into a zone after the boundary area 110. As shown in the example of FIG. 1, in the zone before the boundary area 106, the electrochromic sheet 102 of the vehicle 100 is in an unaltered state (i.e., a state that does not indicated wear or age or some other indication of the vehicle condition). When the vehicle 100 enters the boundary area 108, the electrochromic sheet 102 of the vehicle 100 is altered to provide one or more visual indications of wear 104. These indications of wear 104 may be any suitable visual features (e.g., rust, dents, dirt, smears on the windows etc.) that may allow for an observer outside the vehicle 100 to readily and easily determine a condition of the vehicle 100 as the vehicle 100 is passing through the boundary area 108. In practical terms, an outside observer (such as a checkpoint worker) would be able to easily identify if the vehicle needs to be flagged (or stopped) in order to further inspect the condition of the vehicle 100 because the electrochromic sheet 102 shows indications of wear. However, when not in the boundary area 108, the electrochromic sheet 102 of the vehicle 100 switches back to an unaltered state (i.e., a normal appearance of the car).

In certain embodiments, the driver (or owner) of the vehicle has an option to opt-out (or opt-in) of the checkpoint testing. In certain examples, an organization may provide one or more incentives (e.g., reduced rental fees, rebates, etc.) to encourage someone to allow testing of the vehicle.

Figure 2:
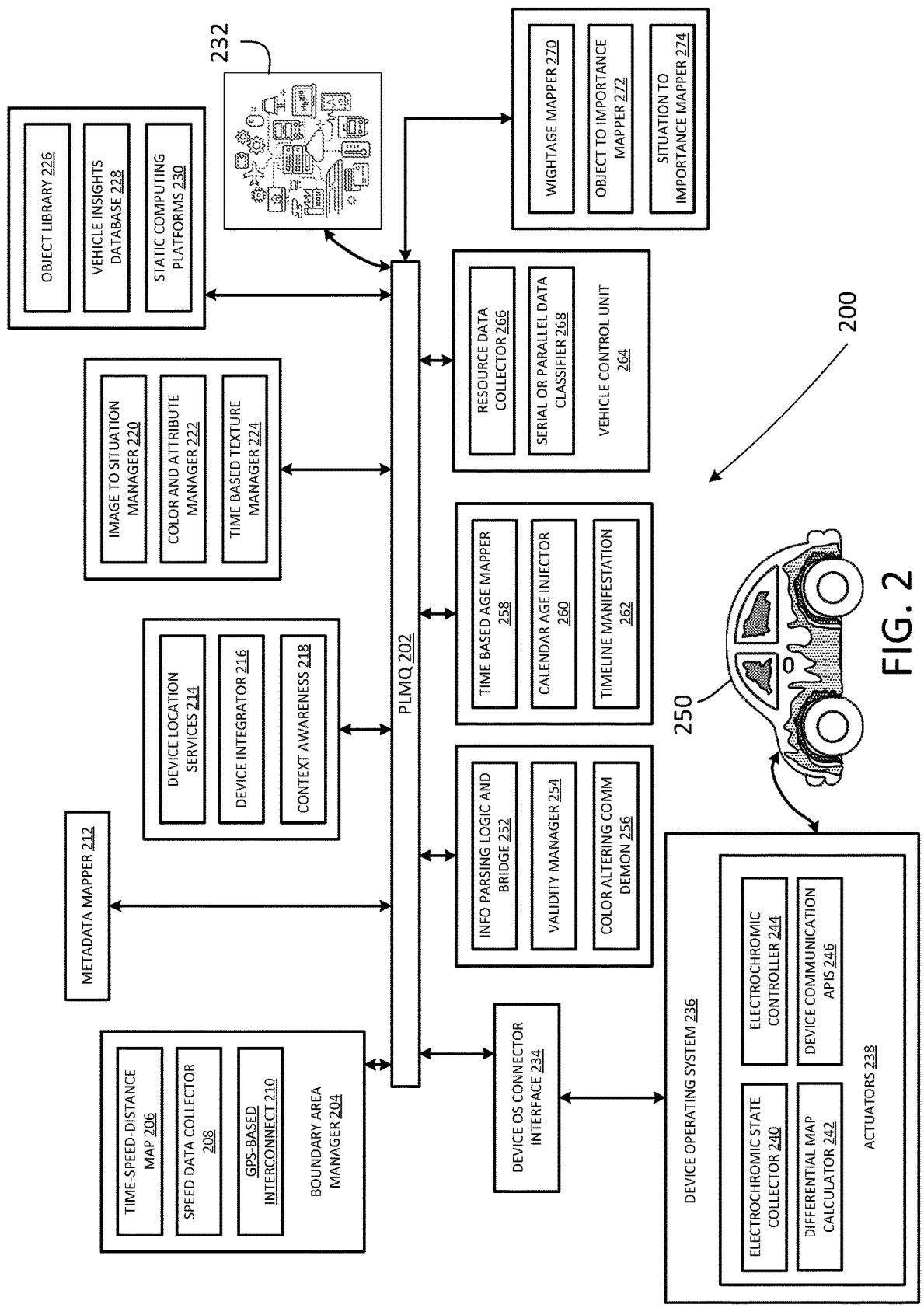
FIG. 2 is a chart illustrating a system architecture for controlling the appearance of a vehicle, according to embodiments.

Referring now to FIG. 2, this figure shows a diagram of a system 200 architecture for controlling the appearance of a vehicle 250, according to certain embodiments. As shown in FIG. 2, several system components are communicatively coupled via a platform messaging queue (PLMQ) or system bus.

First, as shown in FIG. 2, a boundary area manager 204 module or component is communicatively coupled to the other modules through the PLMQ 202. As discussed with regard to FIG. 1, the system 200 determines a boundary area 108 for a vehicle 250, which may indicate the presence of a vehicle check point post. This boundary area 108 generally represents a distance or area where the vehicle 250 should (if necessary) alter the appearance of the electrochromic sheet exterior so that checkpoint personnel can view the car and make informed decisions as to whether to stop the vehicle 250 or not. Referring again to FIG. 2, the boundary area manager 204 module may include one or more components. In the example shown in FIG. 2, the boundary area manager 204 includes a time-speed-distance map module 206, a speed data collector 208 and a GPS-based interconnect 210. The time-speed-distance map module 206 may include a map that displays (or includes information related to) the amount of time that is estimated before the vehicle 250 reaches one or more different checkpoints. The estimate of time may be based on a current velocity or average velocity of the vehicle 250 over a period of time, and a distance to the next checkpoint. It should be appreciated that other information in addition to distance and velocity (e.g., traffic conditions, vehicle accidents, road conditions, weather, etc.) may be used to determine an estimated time to the next checkpoint. The speed-data collector 208 module may include one or more sensors on the vehicle 250 to detect the velocity of the vehicle 250, one or more memory devices to store a record of the vehicle 250 velocity, and any other suitable components for tracking and storing a record of the vehicle 250 velocity over time. The boundary area manager 204 may also include a GPS-based interconnect 210 device, which may be able to track the location of the vehicle 250 using the global positioning system of satellites. The GPS device may be any suitable type of device known to a person of skill in the art.

Thus, in certain embodiments, the boundary area manager 204 includes any suitable number of components/modules capable of predicting an estimated time of arrival of a vehicle 250 at a particular checkpoint. Moreover, the boundary area manager 204 may adjust the size (i.e., the distance) of the boundary area 108 depending on how fast the vehicle 250 is travelling. For example, if there is a target inspection time of five seconds (i.e., the time needed for a checkpoint inspector to visually assess the condition of the vehicle 250 based on the electrochromic sheet appearance) a fast moving vehicle 250 would need to have a larger boundary area 108. That is, in order to achieve the target inspection time, the fast moving vehicle 250 would need to have a longer distance inspection zone. Similarly, if the time-speed distance map 206 and speed data collector 208 of the boundary area manager 204 determines that a vehicle 250 is moving relatively slowly, then the distance of the boundary area 108 would not need to be as long in order the meet the target inspection time. In other embodiments, the boundary area 108 may have a fixed size, and not be dependent on the vehicle 250 speed.

Next, as shown in FIG. 2, a metadata mapper 212 module or component is communicatively coupled to the other modules through the PLMQ 202. The metadata mapper 212 is a module that is configured to receive the information that is being generated by the system 200. In certain examples, the metadata mapper 212 may store the locations of the various checkpoints, and this stored information may be used to trigger changes in the appearance of the vehicle 250 when it is determined that the vehicle 250 is passing through a particular checkpoint. In certain embodiments, the metadata mapper 212 may also store a history of movement of the vehicle 250. Thus, in certain embodiments, if it is determined that a vehicle 250 has recently passed an inspection at a particular checkpoint station and the vehicle 250 is current at the same checkpoint station, the metadata mapper 212 may aid in determining that another inspection of the same vehicle and same inspection station is not necessary.

Next, as shown in FIG. 2, in certain embodiments, a device location services 214 module is commutatively coupled to the rest of the system 200 though the PLMQ 202. The device location services 214 module is something that is enabled on the vehicle 250, and may be able to determine whether or not the vehicle 250 in a geographic region that requires (or does not require) checkpoint examinations. In other words, certain geographical regions (e.g., vehicle rental company return locations, countries, towns, cities, or other suitable locations) may simply not require checks of the vehicle 250 condition. If the device location services 214 module determines that a vehicle 250 is location in a region that does not require checks, then the system 200 would deactivate any altering of the vehicle 250 appearance in these regions. It should be appreciated that the device location services 214 module may deactivate one more additional modules (i.e., to save on memory or processing power) if it determined that the vehicle 250 is in a geographic location where testing is not required.

Next, as shown in FIG. 2, in certain embodiments, a device integrator 216 is operatively coupled to the rest of the system 200 through the PLMQ 202. The device integrator 216 may be able to communicate with one or more electronic devices of the current driver of the vehicle 250. For example, as discussed above, the vehicle 250 itself may have a GPS-based interconnect 210 module that is able to track the location of the vehicle 250. However, the device integrator 216 may be able to communicate with, for example, the GPS system of a cellular phone of the driver of the vehicle 250 as well. Then, a comparison of the GPS data of the driver of the vehicle 250 may be compared with the GPS data of the vehicle itself to determine who the driver of the vehicle 250 is. In other words, the device integrator 216 may be able to utilize data from one or more of the electronic devices of the driver of the vehicle 250 in order to determine an identity of the current driver of the vehicle 250. In certain embodiments, the device integrator 216, after identifying an identity of the driver of the vehicle 250, may make a comparison between the current driver and the registered owner of the vehicle 250. In other examples, in the case of a rented vehicle, the comparison may be between the driver of the vehicle, and the person who signed the rental lease agreement.

Next, as shown in FIG. 2, in certain embodiments, a context awareness 218 module is operatively coupled to the rest of the system 200 through the PLMQ 202. The context awareness 218 module may allow for determining a context of a particular environment, and then cause an appropriate message to be displayed to the particular audience through the electrochromic sheet of the vehicle 250. For example, the context awareness 218 module may determine that a particular vehicle checkpoint station is only interested in viewing details related to the exhaust emissions characteristics of a vehicle and is not interested in viewing details about the age of the vehicle 250 engine. Thus, depending on the context (e.g., the requirements of a particular checkpoint station), different messages (or different visual characteristics) of the same vehicle 250 may be generated in the smart paint. Therefore, the context awareness 218 module may bring context awareness in the electrochromic sheet on the vehicle body to convey a context appropriate message that will deliver only relevant information to the selected audience, and therefore time savings may be achieved.

Next, as shown in FIG. 2, in certain embodiments, an image to situation manager 220 is operatively coupled to the rest of the system 200 through the PLMQ 202. The image to situation manager 220 is something that may validate whether or not a checkpoint is near to the vehicle 250 or not. In certain embodiments, information may be gathered by acquiring images with an image capture device located on the vehicle 250, and then the image to situation manager 220 performs image processing on the images to determine whether or not a vehicle 250 is close to a particular checkpoint. For example, a checkpoint may have visual characteristics that could be identified using image processing. In another example, image processing on the checkpoint building may be performed to determine whether an examiner is actually physically present in the checkpoint facilities. In other embodiments, the image to situation manager 220 controls the type of coloring that is applied to the electrochromic paint depending on the context of the vehicle checkpoint. In certain examples, different images may display on the exterior of the vehicle 250 depending on the checkpoint facility.

Next, as shown in FIG. 2, in certain embodiments, a color and attribute manager 222 is operatively coupled to the rest of the system 200 through the PLMQ 202. The color and attribute manager 222 may include a database of information that relates certain color characteristics to be displayed to certain attributes of the vehicle. For example, if the age of the engine is greater than a certain amount, one particular color (or other visual attribute) may be displayed by the system 200. In another example, if the tires are very old, a different color (or other visual attribute) may be displayed by the system 200. The color and attribute manager 222 may also account for different combinations of attributes of the vehicle 250. For example, if the engine is old, and the tires are old, and the oil has not been changed recently, and the emissions tests have failed, this particular combination of detrimental attributes may result in a more severe (or eye catching) color to be displayed on the smart paint. This would alert the example of a checkpoint station to the fact that a very many things may be wrong with this particular vehicle 250.

Next, as shown in FIG. 2, in certain embodiments, a time based texture manager 224 is operatively coupled to the rest of the system 200 through the PLMQ 202. In certain embodiments, the time based texture manager 224 set the colors (or other visual attributes) of the vehicle 250 depending on the time of day. For example, in the daytime hours certain colors may be used. However, in the dark hours of the night other colors may be used. In other words, the time based texture manager 224 selects colors depending on the time of day (or the time of year, the amount of daylight, weather conditions, etc.) to make is easier for the examiner of the checkpoint station to see.

Next, as shown in FIG. 2, in certain embodiments, an object library 226 is operatively coupled to the rest of the system 200 through the PLMQ 202. The object library 226 may include records of which components of the vehicle 250 need to be tracked for inspection purposes. For example, the object library 226 may include the tires, displays, engine, lights, etc. In certain embodiments, object library 226 keeps track of and monitors the status of the different physical components of the vehicle 250. This information of the object library 226 may be stored in, for example, a vehicle insights database 228 (e.g., a relational database). In one example, if a vehicle 250 owner changes a battery of the car, the object library 226 will update the records in the vehicle insights database 228 accordingly. If the owner of the vehicle 250 has been maintaining the car properly and in a timely manner, these records may be a factor in determining how to display the age of the car to the examiner of the checkpoint station. A well maintained car may be displayed as relatively new, even the overall age of the vehicle may be very old. In contrast, a newer car than has not been maintained well may actually display as an older car due to the lack of timely maintenance by the owner of the vehicle 250.

In certain embodiments, static computing platforms 230 may be coupled to the system 200, and they may be configuration based mechanisms. That is, the static computing platforms 230 may map, for example, a maximum allowed age of an engine of the vehicle 250 to the actual age of the vehicle 250 engine. Thus, in this example, the component of the vehicle 250 would be the engine, and the data regarding the age of the engine would be mapped to the age category. In certain examples, this mapping is a static mapping.

Next, as shown in FIG. 2, in certain embodiments, the system 200 is coupled through the PLMQ 202 to a plurality of internet situated resources 232. The internet situated resources 232 may provide data obtained from a plurality of different devices connected through a network (i.e., the Internet of Things (IoT)). In general, the IoT is a is a system of interrelated computing devices, mechanical and digital machines provided with unique identifiers (UIDs) and the ability to transfer data over a network without requiring human-to-human or human-to-computer interaction. In one example of IoT data, if the make and model of a vehicle is known, data may be obtained through one or more internet situated resources 232 regarding vehicle information, such as the engine type, engine size, fuel efficiency etc. Other information may be obtained such as vehicle warranty information, vehicle component lifecycle information. It should be appreciated that any other suitable information regarding the vehicle may be obtained through the internet situated resources 232 that would aide in determining a condition of the vehicle. For example, the actual vehicle records may indicate that the rear differential fluid was changed 40,000 miles ago, and information obtained through the internet situated resources 232 may indicate that the rear differential fluid should be changed every 30,000 miles. Such a comparison may indicate that this particular vehicle maintenance activity is overdue, and this determination may factor into the final determination of the vehicle condition (and therefore the decision on what extent to alter the physical appearance of the electrochromic sheet of the vehicle). In other words, if comparisons of the service records of the vehicle and the internet situated resources 232 data show several instances where the vehicle is not being maintained properly, the appearance of the vehicle may be altered to show a very old, or dirty, or rusty vehicle.

Next, as shown in FIG. 2, in certain embodiments, a weightage mapper 270 is operatively coupled to the rest of the system 200 through the PLMQ 202. A weightage is a factor that is associated with a particular component of the vehicle 250. For example, in an electric vehicle, more weightage may be associated with the batteries because they are more critical to the operation of the car relative to a traditional gas engine. The weightage mapper 270 may associate weight values to particular components of the car. Vehicle 250 components with a high importance factor associated with the weightage of the object may factor more into the final appearance of the electrochromic sheet of the vehicle.

Next, as shown in FIG. 2, in certain embodiments, an object to importance mapper 272 is operatively coupled to the rest of the system 200 through the PLMQ 202. In certain embodiments, the importance of the object (i.e., a component of the vehicle 250) may be related to the weighting values discussed above with respect to the weightage mapper 270. The importance of an object may be related to the timeline (or age) of a particular object relative to its expiration date. As such, the closer an object gets to its expiration date (or the amount of time it is beyond its expiration date) may factor into how importance the object is. Thus, the object to importance mapper 272 maps and keeps track of the importance of each object.

Next, as shown in FIG. 2, in certain embodiments, a situation to importance mapper 274 is operatively coupled to the rest of the system 200 through the PLMQ 202. The situation to importance mapper 274 may determine how relatively strict (or how relatively lax) the examination rules are at a particular examination checkpoint. For example, at checkpoint A, the rules regarding the age of the engine may be very strict. In this case, the situation to importance mapper 274 may map a relatively high importance of the engine to the particular checkpoint A. However, at checkpoint B, the rules regarding the engine may be very lax (or nonexistent). Thus, the situation to importance mapper 274 may map a relatively low importance of the engine to the particular checkpoint A. This the situation to importance mapper 274 is similar in concept to the object to importance mapper 272 discussed above, except that it relates more specifically to the rules of the different testing facilities rather than vehicle 250 components.

Next, as shown in FIG. 2, in certain embodiments, a vehicle control unit 264 is operatively coupled to the rest of the system 200 through the PLMQ 202. The vehicle control unit 264 may include a resource data collector 266 and a serial or parallel data classifier 268. The resource data collector 266 collects information from various resources. One example of data that the resource data collector 266 collects is from the internet situated resources 232 discussed above (e.g., Smart Data from IoT devices). Another example of data that the resource data collector 266 collects is from the metadata mapper 212 also discussed above, which keeps data related to the history and movements of the vehicle.

Once the data has been collected, it needs to be classified. In certain embodiments, the data is classified with the serial or parallel data classifier 268. For example, if a model type of the vehicle 250 is known, then from web situated APIs, information can be selectively retrieved that is particularly relevant to the particular model of the vehicle 250 of interest. All of the data that is collected by the resource data collector 266, and all of the data that is classified by the serial or parallel data classifier 268 is controlled by the vehicle control unit 264.

Next, as shown in FIG. 2, in certain embodiments, a time based age mapper 258 is operatively coupled to the rest of the system 200 through the PLMQ 202. The time based age mapper 258 is something that gives a mapping of time to age for different components of the vehicle 250. That is, a static mapping is performed between the overall age of the component and the components itself.

Next, as shown in FIG. 2, in certain embodiments, a calendar age injector 260 is operatively coupled to the rest of the system 200 through the PLMQ 202. Each of the vehicle components ages day by day. So, even though the system 200 has previously performed a static mapping of the age of the components (i.e., this information does not change), every day the components are getting older. In other words, the time based age mapper may have determined two years ago that the engine was three years old, it may be necessary to update the current age of the engine based on the present date. Accordingly, the calendar age injector 260 basically determined the current age of the all the components of the vehicle 250 by injecting (or adding) an amount of time that is a difference between the date that the component was originally statically mapped with the time based age mapper 258 and the current date.

Next, as shown in FIG. 2, in certain embodiments, timeline manifestation module 262 is operatively coupled to the rest of the system 200 through the PLMQ 202. The timeline manifestation module 262 uses the information from the time based age mapper 258 and the calendar age injector 260 to determine a current age for all of the components of the vehicle 250. Thus, when the vehicle 250 travels past a particular checkpoint station on a given day, the information generated by the timeline manifestation module 262 will always be accurate.

Next, as shown in FIG. 2, in certain embodiments, an information parsing logic and bridge module 252 is operatively coupled to the rest of the system 200 through the PLMQ 202. In certain examples, the car has a present color, which can be a static color (i.e., a color during normal driving conditions when the car is not at a checkpoint) or it can be an already changed color when the car is in a boundary area 108. That information will be collected by the information parsing logic and bridge module 252. Based on the current information, we need to see if the color needs to be changed. Essentially, the information parsing logic and bridge module 252 has the current color state (or color map) of the vehicle 250.

Based on the current information, we need to see if the color needs to be changed. Next, as shown in FIG. 2, in certain embodiments, a validity manager 254 is operatively coupled to the system 200 through the PLMQ 202. The validity manager 254 analyzes the current information gathered by the information parsing logic and bridge module 252 to determine whether or not the color needs to be changed based on the current location or situation of the vehicle 250.

Next, as shown in FIG. 2, in certain embodiments, a color altering communication demon 256 is operatively coupled to the rest of the system 200 through the PLMQ 202. Based on the current color state of the vehicle 250 determined by the information parsing logic and bridge module 252, and based on a determination of the validity manager 254 that at least some of the color needs to be changed, the color altering communication demon 256 communicates a command through the PLMQ 202 to the device OS connector interface 234.

Next, as shown in FIG. 2, in certain embodiments, the device OS connector interface 234 is operatively coupled to the rest of the system 200 through the PLMQ 202. In certain examples, the information regarding which portions (e.g., pixels) of the electrochromic sheet 102 are transmitted to the device OS connector interface 234.

Next, as shown in FIG. 2, in certain embodiments, a device operating system 236 is present on the vehicle 250 and is operatively coupled to the rest of the system 200 through the device OS connector interface 234 and then through the PLMQ 202. The device operating system 236 includes a number of actuators 238 that control (or trigger) the changes to the electrochromic sheet 102 of the vehicle 250. In particular, the actuators 238 may include a number of different operating system modules, including an electrochromic state collector 240, a differential map calculator 242, an electrochromic controller 244, and one or more device communication APIs 246. The electrochromic state collector 240 may identify the state of each of the pixels (or more generally portions) of the electrochromic sheet 102 of the vehicle 250. In other words, the electrochromic state collector 240 determines the exact color state of the vehicle 250 at the current moment. The differential map calculator 242 uses the information collected by the electrochromic state collector 240, as well as the information transmitted through the device OS connector interface 234 about what colors need to be changed, and determines a differential color map (i.e., what needs to be changed). Based on this generated differential color map information, the electrochromic controller 244 causes the actual color changes to take place on the vehicle 250 through one or more of the device communication APIs 246. For example, voltages can be applied to certain pixels of the electrochromic sheet 102 to cause the color changes to occur. It should be appreciated that the information provided through the device OS connector interface may be based on all, or just some of the modules discussed above with respect to the system 200 shown in FIG. 2.

Figure 3:
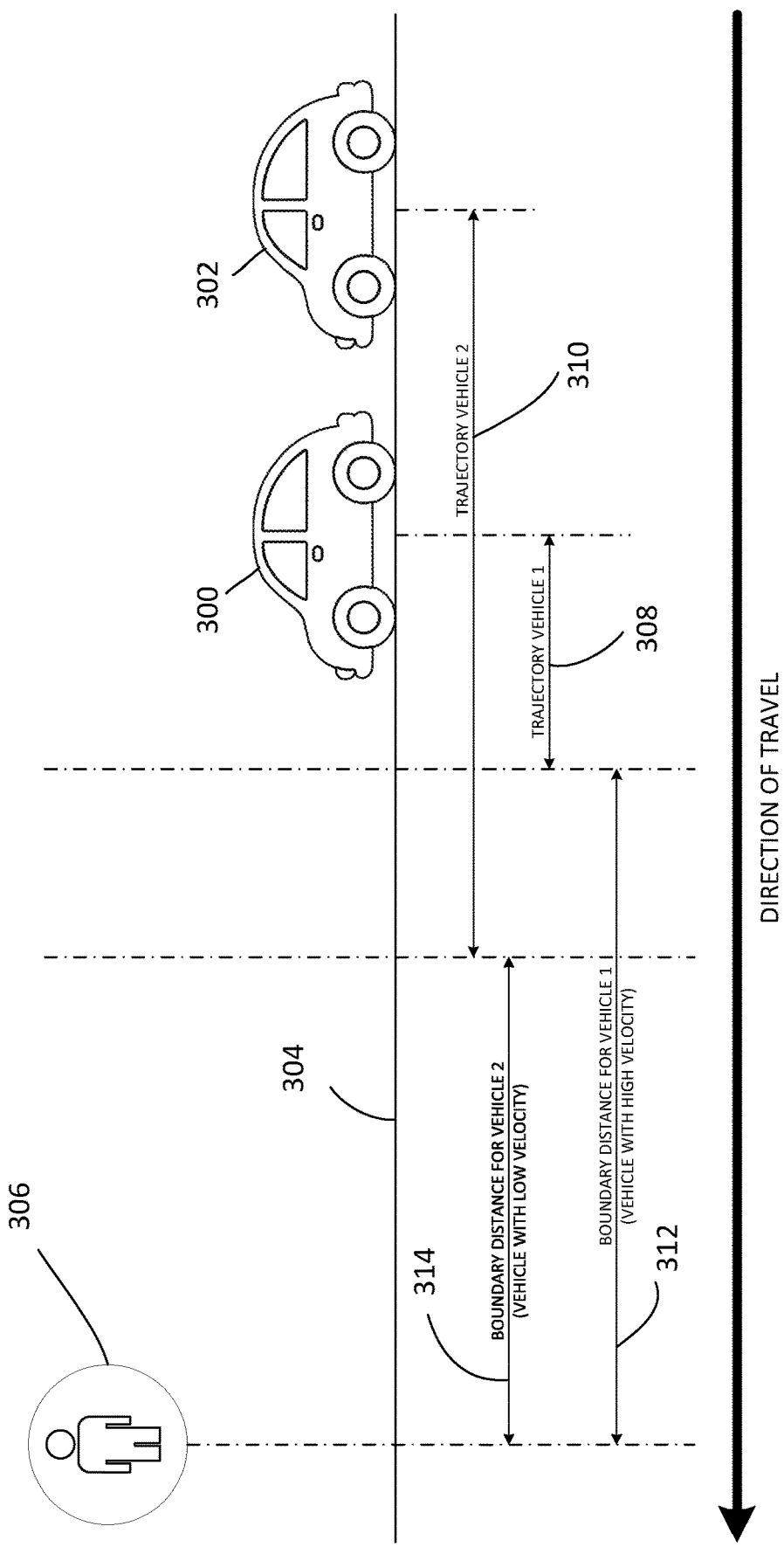
FIG. 3 is a diagram showing the determination of different boundary areas for vehicles traveling at different velocities and at different distances from a checkpoint zone, according to embodiments.

Referring now to FIG. 3, a diagram is shown that explains the determination of different boundary areas for different vehicles traveling at different velocities and at different distances from a vehicle checkpoint. In particular, a first vehicle 300 is travelling at a first velocity V1, and it is located at a position on the right side of the first trajectory 308 for the first vehicle 300. The first vehicle 300 has a relatively high first velocity V1, and therefore the first boundary area 312 for the first vehicle 300 must be relatively large (i.e., because the examiner at the checkpoint station 306 must have a sufficiently long time to be able to view the colors of the vehicle and make a determination as to whether or not to stop the first vehicle 300 for further inspection). Accordingly, the system 200 discussed above with respect to FIG. 2 must cause any color changes to occur when the first vehicle 300 enters the first boundary area 312 (i.e., at the right side of the first boundary area 312 and the left side of the first trajectory 308). As also shown in FIG. 3, a second vehicle 302 is travelling at a second velocity V2, and it is located at a position on the right side of the second trajectory 310 for the second vehicle 302. The second vehicle 302 has a relatively low second velocity V2, and therefore the second boundary area 314 for the second vehicle 302 does not need to be as large as the first boundary area 312 (i.e., because with the slower moving second vehicle 302 the examiner at the checkpoint station 306 will have a sufficiently long time to be able to view the colors of the vehicle and make a determination as to whether or not to stop the second vehicle 302 which is moving slower). Accordingly, the system 200 discussed above with respect to FIG. 2 must cause any color changes to occur when the second vehicle 302 enters the second boundary area 314 (i.e., at the right side of the second boundary area 314 and the left side of the second trajectory 310). As can be seen from the diagram in FIG. 3, different vehicles may have different sizes for the boundary areas, and the start of the boundary areas may occur at different distances from the checkpoint station 306. It should be appreciated that additional factors other than the velocity of the vehicle and the distance of the vehicle from the checkpoint station 306 may be used in determining the dimensions of the boundary areas. For example, a more experiences checkpoint station 306 operator may not need as much time to make a determination of the color state of the vehicles, and the sizes of the boundary areas may be adjusted based on these (or other) factors.

Figure 4:
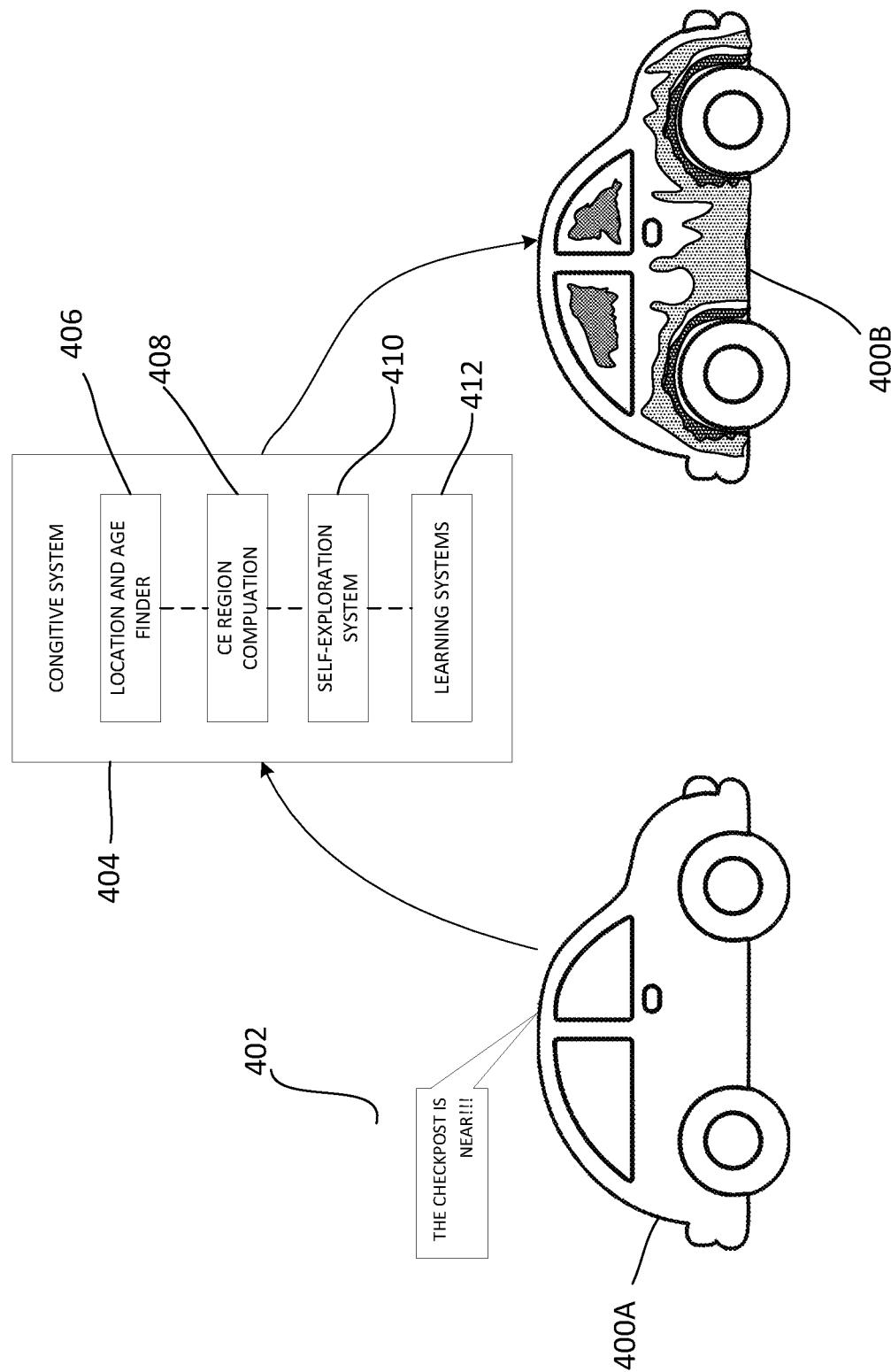
FIG. 4 is a diagram that shows a cognitive system that processes an alteration of the appearance of a vehicle, according to embodiments.

Referring now to FIG. 4, this diagram shows a cognitive system 404 that processes an alteration of the appearance of a vehicle, according to embodiments. It should be appreciated that the cognitive system 404 may include some of the modules described above with respect to FIG. 2, all the modules shown in FIG. 2, or additional modules as well. As shown in FIG. 4, a vehicle 400A approaching a checkpoint station 402 is processed by a cognitive system 404, and when the vehicle is in the boundary area of the checkpoint station 402 the vehicle 400B has an altered appearance. The cognitive system 404 may have any suitable number of processing modules. In this example embodiment, the cognitive system 404 includes a location and age finder 406, a cognitive engine (CE) for region computation 408, a self-exploration system 410 and one or more learning systems 412. The location and age finder 406 module is configured to determine a location of the vehicle and an age of the vehicle itself or the age of the various components of the vehicle. The cognitive engine for region computation 408 is related to location based services such as GPS systems. In certain embodiments, the cognitive engine (CE) for region computation 408 may include one or more of the time-speed-distance maps 206 module from FIG. 2, the speed data collector 208 module from FIG. 2, and the GPS-based interconnect 210 module from FIG. 2. Thus, the cognitive engine (CE) for region computation 408 detects the case that the vehicle is in the boundary region, then instructs the electrochromic controller to change the appearance of the vehicle. The self-exploration system 410 is a system that, once it is determined that the vehicle is in (or is approaching) a checkpoint station, determines what (if any) changes to the appearance of the vehicle are needed. In one example, the self-exploration system 410 generates a new texture map for the electrochromic sheet, and it causes the cognitive system 404 to impose this texture map on the vehicle 400B. One or more deep learning systems 412 may also be used to aid in determining a texture map for the car. After the cognitive system 404 has determined a texture map (i.e., the colors and textures for the various pixels in the electrochromic sheet), these colors and textures are pushed from the cognitive system 404 to the vehicle 400B. Then, the actuators on the vehicle 400B detect the current colors of the vehicle 400B and other parameters, and then they cause an alteration of the relevant fields (i.e., the color and texture is changed to portray the age of the car).

Figure 5:
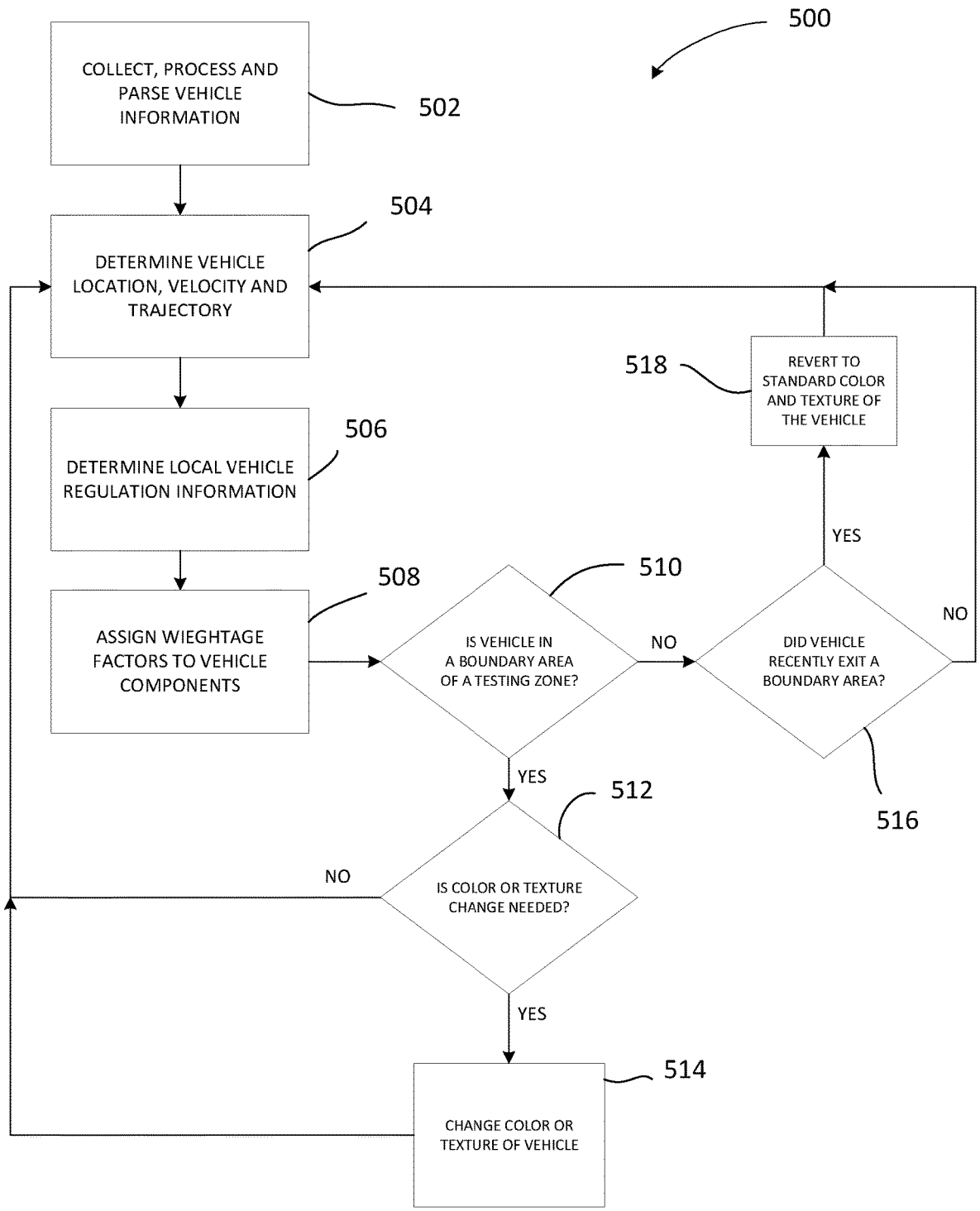
FIG. 5 a flowchart is presented that explains a method of altering the appearance of the vehicle in a checkpoint area, according to embodiments.

Referring now to FIG. 5, a flowchart is presented that explains a method 500 of altering the appearance of the vehicle in a checkpoint area, according to embodiments. As shown in FIG. 5, at operation 502, the system collects, processes and parses the vehicle information. As discussed above in detail with respect to FIG. 2, the method includes the collection of information from various API-based information sources, and from various internal resources on the smart vehicle system. Then the method includes classifying the stream of information using a serial or parallel stream-based classifier to form articulated information related to the vehicle. In particular, in an example, the information is collected from one or more internet situated resources (IoT devices) using an internet based native APIs about the type of vehicle and other characters including engine capacity, engine aging information, valid age for each component (e.g., battery, engine, brake-pads, etc.). Then, metadata objects are created based on the information collected from the internet situated resources. The collected parsed information is stored into metadata mapper objects of vehicle general class objects of the vehicle control unit (VCU).

At operation 504, the method determines the vehicle location, velocity, and trajectory. A dynamic computing platform may trigger GPS interconnect APIs which gives the current location of the vehicle.

At operation 506, dynamic computing platforms are triggered to capture the local regulation information of the vehicle checkpoint stations. This information may be collected using existing information datastores of smart vehicle monitoring units using inbound API instructions and saved to the metadata mappers. Upon determination of the current checkpoint station locations, the internet positioned resources are triggered to capture the area based vehicle inspection criteria (i.e., what elements of the vehicle should be checked, and any standards or rules associated with such checks). The collected rules are classified using a serial or parallel classifier to get the information insights and articulated insights will be used to generate the color and texture in later stages of the process flow.

At operation 508, once the information about the vehicle is collected, parsed, classified, and saved to the object mappers, the weightage factors may be assigned to each of the elements (e.g., vehicle components or features) of the vehicle. In certain examples, this may include importance based weightage assignments for each of the component in a list of components. The importance to the texture will be identified by the cognitive system which will be used at the time of changing the overall sheet texture.

In certain embodiments, the method further comprises the cognition enablement of age-to-color identification and texture mapping based on the time, situation and nature of the event. In certain embodiments, the method polls for the regulator check posts as the event triggering location using a demon process that monitors the trajectory of the vehicle and the check post locations (or any other trigger pointers). This demon keeps the GPS based triggering center along with the boundary area region to activate the color and texture change.

At operation 510, the method determines whether or not the vehicle is in the boundary area of a testing zone. As discussed above with respect to FIG. 2, current vehicle speed statistics may be captured with the collaboration of a vehicle control unit (VCU). The boundary area may be defined based on the velocity of the vehicle and the time required to reach the target point. For example, if the car is moving with high speed, then the color change needs to be triggered earlier. Thus, the determination of the boundary zone cannot be simply distance based, and it should include distance and speed to get a better user experience. With this, it is identified whether the vehicle is in the boundary area or not, and accordingly the decisions are made by cognitive engine regarding the color or texture changes. At operation 510, if it is determined that the vehicle is in a boundary area of a testing zone (510: YES), then the method proceeds to operation 512 to determine whether or not the appearance attributes of the vehicle need to be changes. For example, in a brand new car, where all the components have to aging factors, it may not be necessary to change the appearance of the vehicle at all. In this case, the inspector at the vehicle checkpoint station would know that there is nothing wrong with the car. It should be appreciated that even if a car is brand new, color alterations (e.g., changing the entire electrochromic sheet of the car to green to signify an acceptable state of the vehicle) still may be made in order to alert the inspector that nothing is wrong with the vehicle.

At operation 514, in the case that the vehicle is detected in the boundary region and it is determined that color and texture change are needed (512: YES), then the pre-classified and decided color and texture is pushed to the electrochromic controller of the car sheet. In response to these instructions, the current color and texture data is gathered locally at the electrochromic controller and differential maps are generated. In certain embodiments, a differential map comprises the pixels on the sheet that need to be changed. The region based electrochromic controllers are triggered to change the color and texture of the car sheet. In certain examples, this will portray a texture like rust or dust on the car sheet based on its determined weightage factors. In certain embodiments, the mechanism comprising the color, opacity, texture, font and other interrelated artifacts are based on external luminance factors (e.g., the time of day) and the geographical locations. For example, in the evening time, the colors can be different than morning colors for same situation. These details are also discussed in detail above with respect to FIG. 2. In certain embodiments, the system may articulate insights based on embedding symbols identification and texture and color overriding based on the nature of the event. In certain embodiments, the system further comprises an interactive dialog for input data collection and accordingly instructs the attribute manager of electrochromic controller. In certain embodiments, the system may have the ability to provide the APIs for the electrochromic controller to change the color, intensity and luminance factors from a cognitive engine (CE). In certain embodiments, information in metadata mappers for color and texture change are moved to a training data set which may be used by the CE for history and deep learning purposes. After the change of the vehicle color and/or texture at operation 514, the process returns to operation 504.

At operation 512, in the case that the vehicle is detected in the boundary region and it is determined that a color and texture change are not needed (512: NO), the process continues back to operation 504 to continue determining the vehicle location, velocity and trajectory. If the vehicle travels far enough to encounter another checkpoint testing facility, the process described above repeats.

At operation 516, in certain embodiments, the system polls for the validity of the event and dissolves the attributes to normal based on change in the internal conditions. In other words, if it is determined that the vehicle has traveled out of the boundary zone of the testing center, the method includes reverting to a standard color and texture of the vehicle (i.e., normal operation color and texture). After the vehicle has been reverted to the normal texture, the process continues back to operation 504 to continue determining the vehicle location, velocity and trajectory. If the vehicle travels far enough to encounter another checkpoint testing facility, the process described above repeats.

At operation 510, in the case that the vehicle is determined not to be in a boundary area of a testing zone (510: NO), it is then determined whether or not the vehicle has just recently passed through a boundary area. In other words, once the vehicle leaves the boundary, it may be desirable to revert the appearance of the vehicle back to the original state. Thus, if it is determined at operation 516 that the vehicle did recently leave a boundary area (512: YES), then the method continues to operation 518, where the system causes the electrochromic sheet of the vehicle to revert to a standard color and texture (e.g., a condition under normal driving conditions when the vehicle is not at a testing station). Then, after the colors have been reverted, the process goes back to operation 504 to continue to check the location, velocity and trajectory of the vehicle. If it is determined at operation 516 that the vehicle did not recently leave a boundary area (e.g., the vehicle never went through a checkpoint station in the first place), then the process continues back to operation 504.

In certain embodiments, a system includes an electrochromic paint controller on a smart vehicle, and a method of controlling the appearance of the vehicle includes collecting vehicle information from various elements of the vehicle to articulate an appropriate color, texture and/or the embedding of symbol attributes on the vehicle body. In certain embodiments, the method includes data collector demons that collectively gather an information stream from a vehicle control unit (VCU). The VCU may include an audit event log, and a VCU audit snippet may include associated time-stamped values. In certain embodiments, once an element (or component) of the vehicle is swapped or changed, then this information will be automatically provided to the system demon using a proactive interrupt driven alert.

In certain embodiments, a mechanism in the vehicle control unit and an age-based color changing apparatus collects static computing resources of the car by in-band or out-of-bound APIs. In certain embodiments, the vehicle identification number (VIN), static color, age, registration details, type of vehicle, and other data may be fetched and saved to one or more metadata mappers. In certain embodiments, metadata mappers are maintained to get vehicle information insights based on a classification of collected data. Once the information is parsed, this information is supplied to a serial or parallel classifier using a machine learning model to identify the collective age and weightage factors of the vehicle.

In certain embodiments, element data may be classified using a serial and or parallel classifier as a dynamic computing platform, while static computing platforms of the cognitive systems collects the data from internet situated repositories and other static metadata learning mappers of deep learning.

In certain embodiments, a mechanism is included to articulate the age-based intuition of the car and the element (or vehicle component) age color factors. In some examples, the insights database (DB) is supplied to a color and texture determination module of the system which cognitively selects the color of the vehicle body, a texture of the vehicle body, and may also embed supplementary objects (like rust) with suitable color-combinations. In certain examples, the color and texture identification are dependent on the age-based need of the message.

In certain embodiments, collaborative age determination is generated with an internal component replace interrupt. In certain embodiments, a calendar age weightage may be injected each day as a cronjob to trigger changing the communitive age factors.

In certain embodiments, a geographical location identifier and GPS maps of the system collects the information about regularity checkpoints. In certain embodiments, once it is detected that the check-posts are in a defined boundary area, then the predetermined color and texture characteristics are supplied to electrochromic controller to change the color of car sheet. In certain embodiments, the color, texture, fonts, message, design and other interrelated designs are made, the electrochromic controller is instructed with all the codes, and accordingly the attributes of the electrochromic coating are changed.

In certain embodiments, the system further comprises the selection of the area for texture change based on the importance-based weightage of the internal components and decides the color and texture points of the vehicle body. For example, the engine of the vehicle may be considered to be a key element of the vehicle, so the communitive age is more heavily weighted. In this example, more of the area of vehicle's electrochromic sheet may display rusted characteristics. It should be appreciated that other visual characteristics other than rust may be emphasized as well.

In certain embodiments, the electrochromic controller receives a signal, identifies the existing color and texture of the vehicle, and a differential map is generated. The color and texture changes are imposed to the pixels of differential map with new values. In certain examples, the contents are pushed to the electrochromic paint manager to dissolve (or revert) the attributes to a normal state when the GPS has detected that the vehicle in no longer in the boundary area definition.

Figure 6:
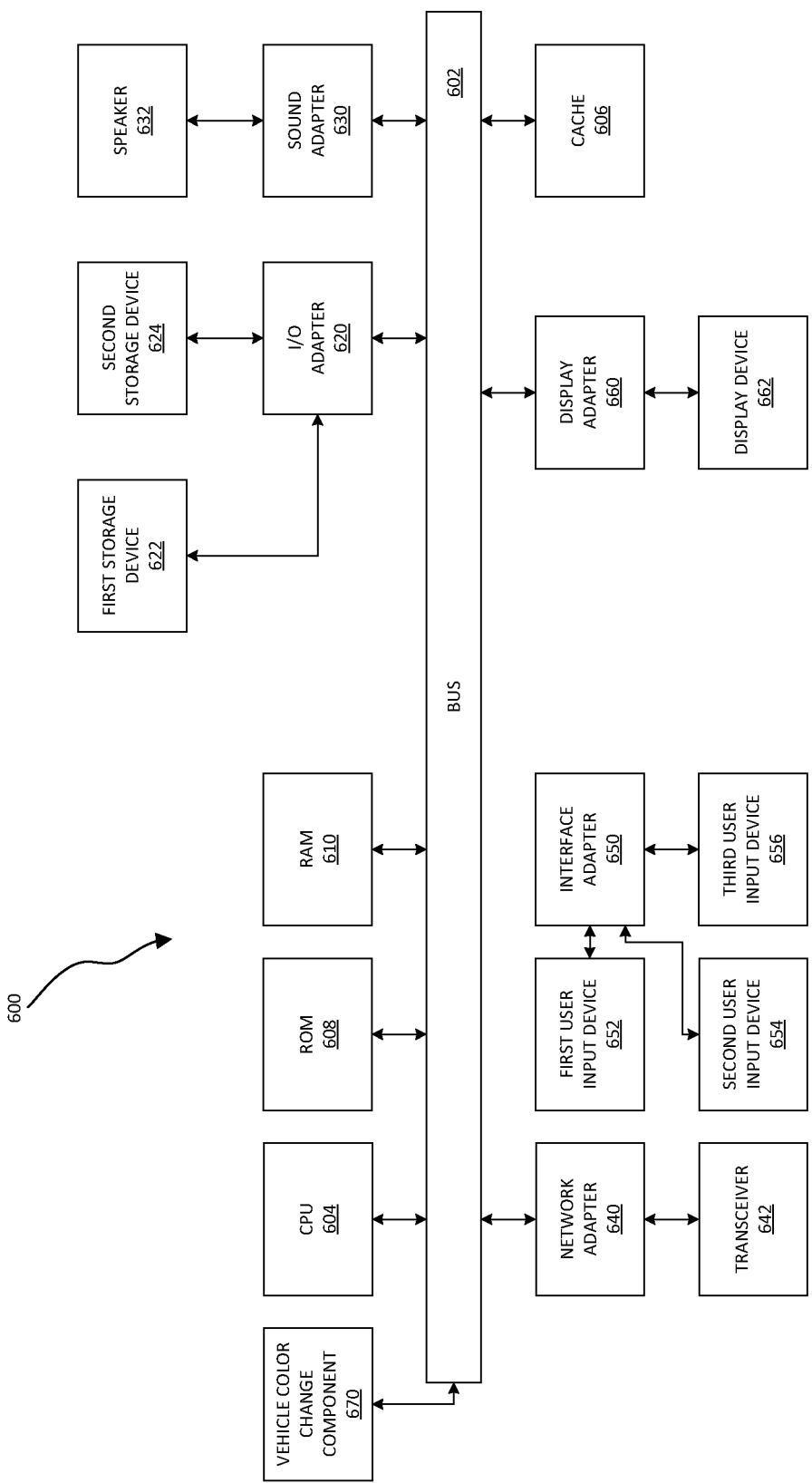
FIG. 6 is a block diagram of a processing system, according to embodiments.

Referring now to FIG. 6, an exemplary processing system 600 to which the present embodiments may be applied is shown in accordance with one embodiment. The processing system 600 includes at least one processor (CPU) 604 operatively coupled to other components via a system bus 602. A cache 606, a Read Only Memory (ROM) 608, a Random-Access Memory (RAM) 610, an input/output (I/O) adapter 620, a sound adapter 630, a network adapter 640, a user interface adapter 650, a display adapter 660, and a vehicle color change component 670 are operatively coupled to the system bus 602.

A first storage device 622 and a second storage device 624 are operatively coupled to system bus 602 by the I/O adapter 620. The storage devices 622 and 624 may be any of a disk storage device (e.g., a magnetic or optical disk storage device), a solid-state magnetic device, and so forth. The storage devices 622 and 624 may be the same type of storage device or different types of storage devices.

A speaker 632 is operatively coupled to system bus 602 by the sound adapter 630. A transceiver 642 is operatively coupled to system bus 602 by network adapter 640. A display device 662 is operatively coupled to system bus 602 by display adapter 660.

A first user input device 652, a second user input device 654, and a third user input device 656 are operatively coupled to system bus 602 by user interface adapter 650. The user input devices 652, 654, and 656 may be any of a keyboard, a mouse, a keypad, an image capture device, a motion sensing device, a microphone, a device incorporating the functionality of at least two of the preceding devices, or any other suitable types of input devices. The user input devices 652, 654, and 656 may be the same type of user input device or different types of user input devices. The user input devices 652, 654, and 656 are used to input and output information to and from system 600. In certain embodiments, component 690 with a context and anomaly detection mode is operatively coupled to system bus 602.

The processing system 600 may also include other elements (not shown), as readily contemplated by one of skill in the art, as well as omit certain elements. For example, various other input devices and/or output devices may be included in processing system 600, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 600 are readily contemplated by one of ordinary skill in the art given the teachings of the present disclosure provided herein.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 7:
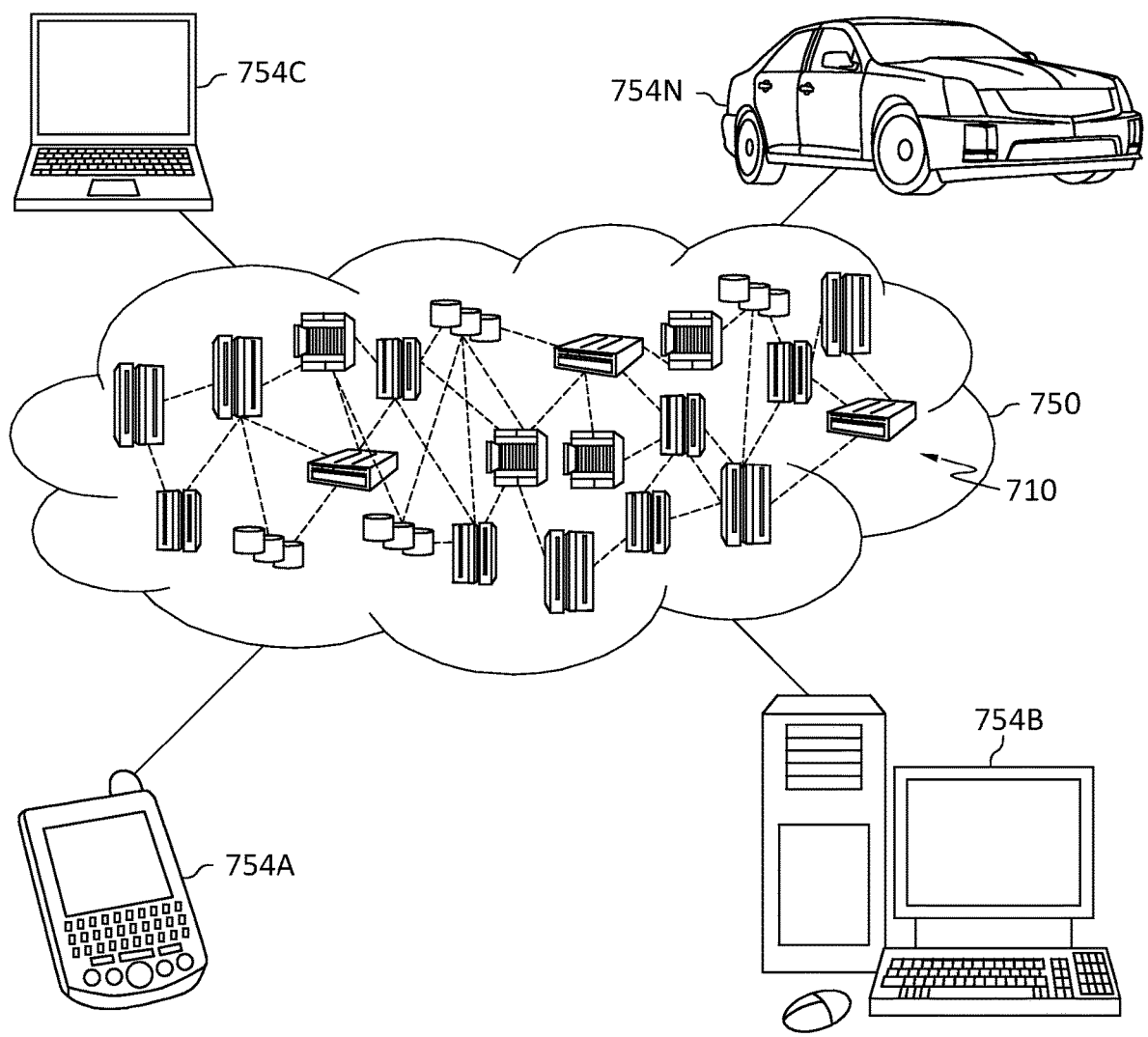
FIG. 7 is a block diagram of an illustrative cloud computing environment having one or more computing nodes with which local computing devices used by cloud customers to communicate, according to embodiments.

Referring now to FIG. 7, illustrative cloud computing environment 750 is depicted. As shown, cloud computing environment 750 includes one or more cloud computing nodes 710 with which local computing devices used by cloud consumers, such as, for example, personal digital assistant (PDA) or cellular telephone 754A, desktop computer 754B, laptop computer 754C, and/or automobile computer system 754N may communicate. Nodes 710 may communicate with one another. They may be grouped (not shown) physically or virtually, in one or more networks, such as Private, Community, Public, or Hybrid clouds as described hereinabove, or a combination thereof. This allows cloud computing environment 750 to offer infrastructure, platforms and/or software as services for which a cloud consumer does not need to maintain resources on a local computing device. It is understood that the types of computing devices 754A-N shown in FIG. 6 are intended to be illustrative only and that computing nodes 710 and cloud computing environment 750 can communicate with any type of computerized device over any type of network and/or network addressable connection (e.g., using a web browser).

Figure 8:
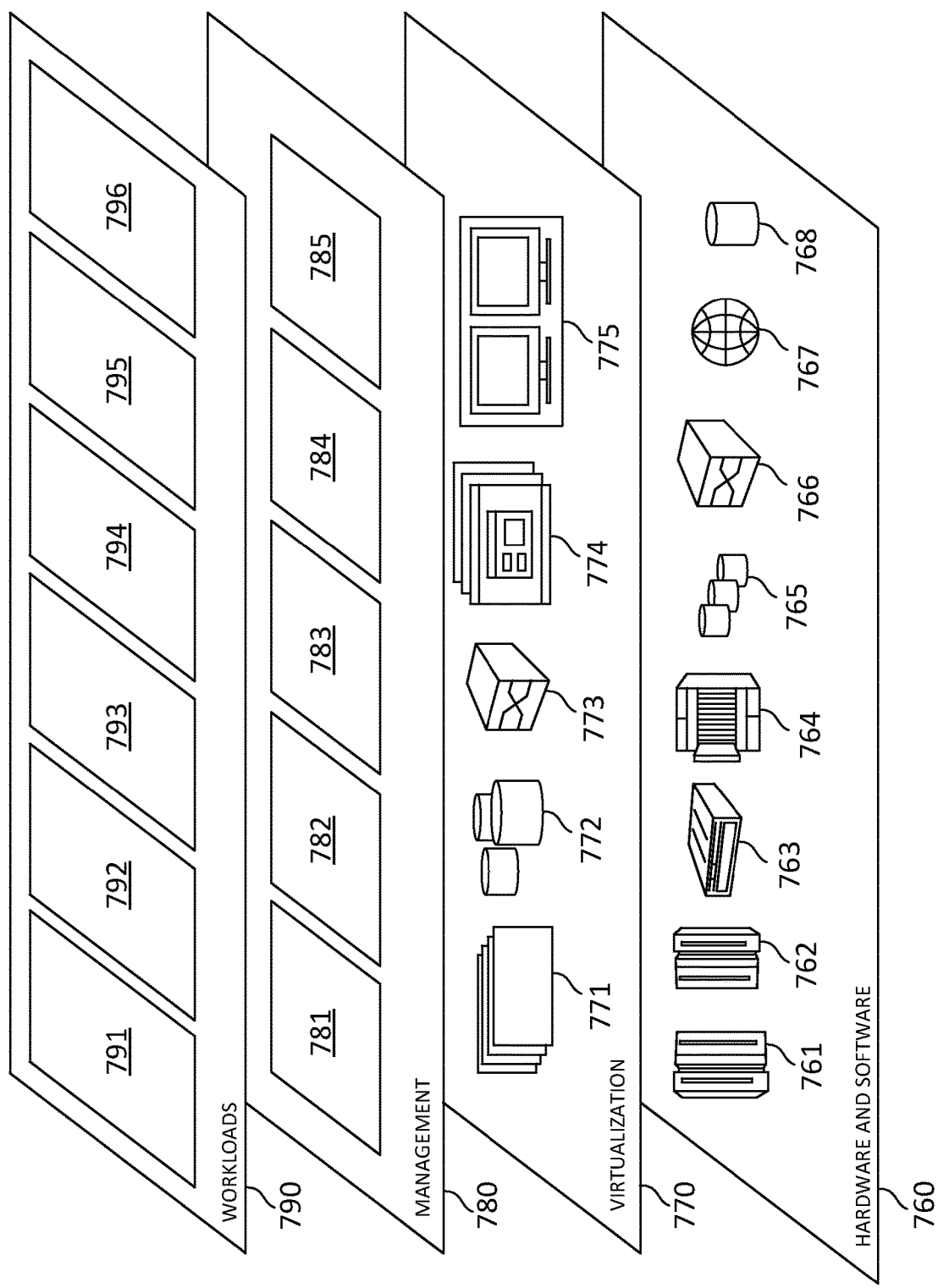
FIG. 8 is a block diagram of a set of functional abstraction layers provided by a cloud computing environment, according to embodiments.

Referring now to FIG. 8, a set of functional abstraction layers provided by cloud computing environment 750 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 760 includes hardware and software components. Examples of hardware components include: mainframes 761; RISC (Reduced Instruction Set Computer) architecture-based servers 762; servers 763; blade servers 764; storage devices 765; and networks and networking components 766. In some embodiments, software components include network application server software 767 and database software 768.

Virtualization layer 770 provides an abstraction layer from which the following examples of virtual entities may be provided: virtual servers 771; virtual storage 772; virtual networks 773, including virtual private networks; virtual applications and operating systems 774; and virtual clients 775.

In one example, management layer 780 may provide the functions described below. Resource provisioning 781 provides dynamic procurement of computing resources and other resources that are utilized to perform tasks within the cloud computing environment. Metering and Pricing 782 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 783 provides access to the cloud computing environment for consumers and system administrators. Service level management 784 provides cloud computing resource allocation and management such that required service levels are met. Service Level Agreement (SLA) planning and fulfillment 785 provide pre-arrangement for, and procurement of, cloud computing resources for which a future requirement is anticipated in accordance with an SLA.

Workloads layer 790 provides examples of functionality for which the cloud computing environment may be utilized. Examples of workloads and functions which may be provided from this layer include: mapping and navigation 791; software development and lifecycle management 792; virtual classroom education delivery 793; data analytics processing 794; transaction processing 795; and neural network anomaly detection training processing 796.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions.

The descriptions of the various embodiments have been presented for purposes of illustration and are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for altering an appearance of an electrochromic coating of a vehicle, the method comprising:
    obtaining vehicle information related to at least one vehicle attribute;
    applying weightage factors to the at least one vehicle attribute;
    determining that a vehicle is in a boundary area of a testing zone based on a determined location of the vehicle;
    changing a base appearance of the electrochromic coating of the vehicle to an altered appearance based on the determination that the vehicle is in the boundary area and based on the weightage factors of the vehicle components.

2. The computer implemented method of claim 1, further comprising obtaining testing zone regulation information, and wherein changing the appearance of the electrochromic coating is further based on the testing zone regulatory information.

3. The computer implemented method of claim 1, wherein for one of the vehicle attributes, the vehicle information is an age of the vehicle.

4. The computer implemented method of claim 1, wherein for one of the vehicle attributes, the vehicle information includes maintenance history of at least one vehicle component.

5. The computer implemented method of claim 1, further comprising:
    after changing the appearance of the electrochromic coating of the vehicle, determining that the vehicle is no longer in the boundary area; and
    reverting the appearance of the electrochromic coating back to the base appearance.

6. The computer implemented method of claim 1, wherein the altered appearance of the electrochromic coating includes indications of an age or condition of the vehicle.

7. The computer implemented method of claim 6, wherein the indications of the age or condition of the vehicle include at least selected from the group consisting of rust, dirt, dents, paint fading and paint chipping.

8. The computer implemented method of claim 1, wherein the vehicle information is obtained from a plurality of different internet situated resources that are connected to the vehicle connected through a network.

9. The computer implemented method of claim 1, further comprising determine a size of the boundary area of the testing zone based on at least one of the vehicle velocity and the vehicle trajectory.

10. The computer implemented method of claim 1, wherein ages are statically mapped to a plurality of vehicle components based on respective ages of the vehicle components at a first point in time, and wherein the ages of the vehicle components are updated at a second later point in time when the vehicle is in the boundary area.

11. A computer program product for altering an appearance of an electrochromic coating of a vehicle, the computer program product comprising:
    one or more computer readable storage media, and program instructions collectively stored on the one or more computer readable storage media, the program instructions comprising:
    program instructions to obtain vehicle information related to at least one vehicle attribute;

program instructions to apply weightage factors to the at least one vehicle attribute;

program instructions to determine that a vehicle is in a boundary area of a testing zone based on a determined location of the vehicle;

program instructions to change a base appearance of the electrochromic coating of the vehicle to an altered appearance based on the determination that the vehicle is in the boundary area and based on the weightage factors of the vehicle components.

12. The computer program product of claim 11, further comprising obtaining testing zone regulation information, and wherein changing the appearance of the electrochromic coating is further based on the testing zone regulatory information.

13. The computer program product of claim 11, wherein for one of the vehicle attributes, the vehicle information is an age of the vehicle.

14. The computer program product of claim 11, wherein for one of the vehicle attributes, the vehicle information includes maintenance history of at least one vehicle component.

15. The computer program product of claim 11, further comprising:

after changing the appearance of the electrochromic coating of the vehicle, determining that the vehicle is no longer in the boundary area; and reverting the appearance of the electrochromic coating back to the base appearance.

16. The computer program product of claim 11, wherein the altered appearance of the electrochromic coating includes indications of an age or condition of the vehicle.

17. The computer program product of claim 16, wherein the indications of the age or condition of the vehicle include at least selected from the group consisting of rust, dirt, dents, paint fading and paint chipping.

18. A computer system comprising:

one or more computer readable storage media with program instructions collectively stored on the one or more computer readable storage media; and one or more processors configured to execute the program instructions to perform a method for generating a training model for object detection, the method comprising:

obtaining vehicle information related to at least one vehicle attribute;

applying weightage factors to the at least one vehicle attribute;

determining that a vehicle is in a boundary area of a testing zone based on a determined location of the vehicle;

changing a base appearance of the electrochromic coating of the vehicle to an altered appearance based on the determination that the vehicle is in the boundary area and based on the weightage factors of the vehicle components.

19. The computer system of claim 18, further comprising obtaining testing zone regulation information, and wherein changing the appearance of the electrochromic coating is further based on the testing zone regulatory information.

20. The computer system of claim 18, wherein for one of the vehicle attributes, the vehicle information is an age of the vehicle.

* * * * *